(12) United States Patent
Cao et al.

(10) Patent No.: US 12,014,504 B2
(45) Date of Patent: Jun. 18, 2024

(54) METHOD AND APPARATUS FOR ACCELERATING HYPERSPECTRAL VIDEO RECONSTRUCTION

(71) Applicant: NANJING UNIVERSITY, Jiangsu (CN)

(72) Inventors: Xun Cao, Jiangsu (CN); Erqi Huang, Jiangsu (CN); Du Chen, Jiangsu (CN); Linsen Chen, Jiangsu (CN)

(73) Assignee: NANJING UNIVERSITY, Jiangsu (CN)

( * ) Notice: Subject to any disclaimer, the term of this patent is extended or adjusted under 35 U.S.C. 154(b) by 187 days.

(21) Appl. No.: 17/626,747

(22) PCT Filed: Jul. 14, 2020

(86) PCT No.: PCT/CN2020/101917
§ 371 (c)(1),
(2) Date: Jan. 12, 2022

(87) PCT Pub. No.: WO2021/008528
PCT Pub. Date: Jan. 21, 2021

(65) Prior Publication Data
US 2022/0254039 A1 Aug. 11, 2022

(30) Foreign Application Priority Data
Jul. 15, 2019 (CN) .......................... 201910633965.7

(51) Int. Cl.
*G06K 9/00* (2022.01)
*G06T 3/40* (2006.01)
*G06T 7/30* (2017.01)

(52) U.S. Cl.
CPC .................. *G06T 7/30* (2017.01); *G06T 3/40* (2013.01); *G06T 2207/10016* (2013.01); *G06T 2207/10024* (2013.01)

(58) Field of Classification Search
CPC .......... G01J 3/2823; G06T 2207/10024; G06T 2207/10016; G06T 2207/10036; G06T 3/40; G06T 1/60; G06T 7/30; H04N 9/67
See application file for complete search history.

(56) References Cited

U.S. PATENT DOCUMENTS

| 9,285,309 B2 | 3/2016 | Choi | |
|---|---|---|---|
| 2008/0002879 A1* | 1/2008 | Jeon | G06V 10/147 382/154 |
| 2017/0186195 A1 | 6/2017 | Lin et al. | |

FOREIGN PATENT DOCUMENTS

| CN | 107230185 A | 10/2017 | |
|---|---|---|---|
| CN | 109146787 A * | 1/2019 | G06T 3/4007 |

(Continued)

OTHER PUBLICATIONS

L. Wang, Z. Xiong, D. Gao, G. Shi, Wenjun Zeng and F. Wu, "High-speed hyperspectral video acquisition with a dual-camera architecture," 2015 IEEE Conference on Computer Vision and Pattern Recognition (CVPR), Boston, MA, 2015, pp. 4942-4950, doi: 10.1109/CVPR.2015.7299128. (Year: 2015).*

(Continued)

*Primary Examiner* — Emily C Terrell
*Assistant Examiner* — Kevin M Coomber
(74) *Attorney, Agent, or Firm* — NKL Law; Allen Xue

(57) ABSTRACT

A method for accelerating hyperspectral video reconstruction includes steps of: acquiring, according to a spectral video and an RGB video captured by a hyperspectral video camera, a calibration matrix of the spectral video and the RGB video; sorting the calibration matrix to generate an ordered calibration matrix; converting, according to the ordered calibration matrix, the spectral video and the RGB video into a data matrix in a parallel manner; acquiring all related calibration points of a reconstruction region according to the ordered calibration matrix; and, reconstructing a (Continued)

hyperspectral video in a parallel manner according to the related calibration points and the data matrix. The related calibration points are acquired by sorting the calibration matrix, such that the number of times the calibration matrix is traverse is reduced, and the computation amount of hyperspectral video reconstruction is decreased.

6 Claims, 5 Drawing Sheets

(56) References Cited

FOREIGN PATENT DOCUMENTS

| | | |
|---|---|---|
| CN | 109146787 A | 1/2019 |
| CN | 110490937 A | 11/2019 |

OTHER PUBLICATIONS

Chen, Du;"Study of Airborne Spectral Video Acquisition System and Algorithm"; Basic Sciences, China Master's Theses full-Text Database; No. 7; Jul. 15, 2019; ISSN: 1674-0246.

\* cited by examiner (a)

(d)

(b)

(e)

(c)

(f)

| Band | RMSE | SSIM | PSNR |
|---|---|---|---|
| 500nm | 1.8898 | 0.9972 | 42.6026 |
| 550nm | 1.8865 | 0.9972 | 42.6177 |
| 600nm | 1.9424 | 0.9973 | 42.3640 |
| 650nm | 1.9934 | 0.9974 | 42.1391 |
| 700nm | 1.9973 | 0.9974 | 42.1217 |
| 750nm | 1.9735 | 0.9973 | 42.2260 |

FIG. 5

METHOD AND APPARATUS FOR ACCELERATING HYPERSPECTRAL VIDEO RECONSTRUCTION

TECHNICAL FIELD

The present invention relates to the field of computational photography, and in particular to a method and apparatus for accelerating hyperspectral video reconstruction.

BACKGROUND OF THE PRESENT INVENTION

Recently, with the continuous innovation of the hyperspectral imaging technology in software and hardware research, hyperspectral imaging has played an important role in many fields such as aerial remote sensing, chemical analysis and environmental monitoring.

In order to realize more accurate data, more stable performance and higher speed of hyperspectral imaging, some methods for accelerating hyperspectral video reconstruction have been proposed. Common hyperspectral video reconstruction algorithms are generally into two categories.

The first category of these methods is data optimization, where the spectral data to be reconstructed is optimized mainly by feature extraction, principal component analysis, dimension compression or other methods, and the hyperspectral video is reconstructed and computed by using the optimized spectral data after the duplicate data is removed to reserve main features. The acceleration effect is achieved by reducing the computation of redundant data. Such methods will take a long time for preprocessing and data optimization, and cannot transfer in real time the preprocessed spectral data to a next step for hyperspectral video reconstruction.

The second category of these methods is parallel computing, where hyperspectral video reconstruction algorithms are mainly executed in a temporal parallel or spatial parallel computing manner, thereby achieving the acceleration effect. However, the linear storage of spectral calibration data is not taken into consideration in such methods, many invalid computations are performed during the hyperspectral video reconstruction, resulting in the waste of time.

Therefore, during the acceleration of hyperspectral video reconstruction, the preprocessing speed is low due to the huge amount of data of RGB video and spectral video. Moreover, it is necessary to perform reconstruction in an effective region with reference to the spectral calibration data, and the spectral calibration data that has not been optimized in storage structure is put into a parallel memory for computing, so that many invalid computations will be added during the hyperspectral video reconstruction and the reconstruction time is longer. The method to solve the problem of the huge amount of data and slow spectral calibration data traversal is to use cropped or sampled spectral video and RGB video to decrease the number of spatial pixels, thereby reducing the amount of data, reducing the reconstruction range of the hyperspectral video, reducing the amount of spectral calibration data to be traversed and increasing the traversal speed. However, the acceleration problem cannot be completely solved by cropping or sampling the spectral video and RGB video. Particularly when a hyperspectral camera needs to collect high-speed dynamic targets and large-area complex scenes, it is difficult to reconstruct high-resolution and high-accuracy hyperspectral video.

SUMMARY OF THE PRESENT INVENTION

In order to accelerate hyperspectral video reconstruction while ensuring that the accuracy of hyperspectral data and the resolution of hyperspectral images remain unchanged, the present invention provides a method and apparatus for accelerating hyperspectral video reconstruction.

The method of the present invention employs the following technical solutions.

A method for accelerating hyperspectral video reconstruction is provided, including steps of:
   S1: acquiring, according to a spectral video and an RGB video captured by a hyperspectral video camera, a calibration matrix of the spectral video and the RGB video;
   S2: sorting, according to the conditional constraint of spatial down-sampling in the hyperspectral video camera, the calibration matrix to generate an ordered calibration matrix;
   S3: converting, according to the ordered calibration matrix, the spectral video and the RGB video into a data matrix in a parallel computing manner;
   S4: acquiring all related calibration points of a reconstruction region according to the ordered calibration matrix; and
   S5: reconstructing a hyperspectral video in a parallel computing manner according to the related calibration points and the data matrix.

Further, in the step S1, the specific process of acquiring a calibration matrix of the spectral video and the RGB video is:
   placing two-dimensional spatial coordinates of the first vertex of each calibration rectangle of the spectral video into a first-dimensional column vector, placing two-dimensional spatial coordinates of the fourth vertex of each calibration rectangle of the spectral video into a second-dimensional column vector, and placing two-dimensional spatial coordinates of each calibration point of the RGB video into a third-dimensional column vector; and, combining the first-dimensional column vector, the second-dimensional column vector and the third-dimensional column vector to form a three-dimensional column vector matrix after they are placed, and using the three-dimensional column vector matrix as a calibration matrix.

Further, in the step S2, the specific process of generating an ordered calibration matrix is:
   distributing spatial down-sampling points of the hyperspectral video camera in the RGB video by using two-dimensional spatial coordinates (x, y), and sorting the calibration matrix according to the distribution rule of the spatial down-sampling points;
   vertically sorting the calibration matrix by using a quick sorting algorithm for two-dimensional space, i.e., vertically sorting the whole calibration matrix by using the quick sorting algorithm by comparing the size of the y-coordinate value of the third-dimensional column vector; and, transversely sorting the calibration matrix, i.e., transversely sorting the whole calibration matrix by the quick sorting algorithm by comparing the size of the x-coordinate value of the third-dimensional column vector;
   generating two M×N ordered calibration matrices according to the number of rows M and the number of columns N of the spatial down-sampling points of the hyperspectral video camera, placing the first ordered calibration matrix in calibration data of the spectral video as a spectral ordered calibration matrix, putting the first-dimensional column vector and the second-dimensional column vector of the sorted calibration matrix in the spectral ordered calibration matrix, setting a position where the spectral ordered calibration matrix does not contain the spatial down-sampling points of the hyperspectral video camera to be zero, placing the second ordered calibration matrix in calibration data of the RGB video as an RGB ordered calibration matrix, placing the third-dimensional column vector of the sorted calibration matrix in the RGB ordered calibration matrix, and setting a position where the RGB ordered calibration matrix does not contain the spatial down-sampling points of the hyperspectral video camera to be zero; and according to the RGB ordered calibration matrix, computing transverse distance values between non-zero data points among half of mark points, and recording an average of the transverse distance values as a transverse distance between adjacent calibration points; and, computing vertical distance values between non-zero data points among half of mark points, and recording an average of the vertical distance values as a vertical distance between adjacent calibration points.

Further, in the step S3, the specific process of acquiring a data matrix is:

acquiring the midpoint of the transverse position of each calibration rectangle according to the spectral ordered calibration matrix; acquiring the vertical length of each calibration rectangle according to the spectral ordered calibration matrix; accelerating the generation of the spectral data matrix in a parallel computing manner in the spectral video; accelerating the synthesis of the RGB data matrix in a parallel computing manner according to the RGB video; and, combining the spectral data matrix and the RGB data matrix to form a data matrix.

Further, in the step S4, the specific process of acquiring related calibration points is:

computing a reconstruction range of each reconstruction point according to the transverse distance between adjacent calibration points and the vertical distance between adjacent calibration points, and directly indexing the RGB ordered calibration matrix to obtain all related calibration points of each reconstruction point of the RGB data matrix.

The present invention provides an apparatus for accelerating hyperspectral video reconstruction, including:

a calibration matrix acquisition module configured to acquire a calibration matrix of the captured spectral video and RGB video;

a calibration matrix sorting module configured to sort the calibration matrix;

an adjacent calibration point vertical computation unit configured to compute an average transverse distance value between non-zero data points among half of mark points in an RGB ordered calibration matrix;

an adjacent calibration point transverse computation unit configured to compute an average vertical distance value between non-zero data points among half of mark points in the RGB ordered calibration matrix;

an ordered calibration matrix generation module configured to generate an ordered calibration matrix according to spatial down-sampling points of a hyperspectral video camera;

a data matrix generation module configured to convert the spectral video and the RGB video into a data matrix in a parallel manner according to the ordered calibration matrix;

a spectral data parallel computation unit configured to copy a spectral ordered calibration matrix and the spectral video into a parallel computation memory, and perform thread indexing to control the computation of each spectral data point;

an RGB data parallel computation unit configured to copy the RGB video into the parallel computation memory and perform thread indexing to control the computation of each RGB data point;

a calibration point acquisition module configured to acquire all related calibration points of a reconstruction region according to the ordered calibration matrix; and a hyperspectral video reconstruction module configured to reconstruct a hyperspectral video in a parallel manner according to the related calibration points and the data matrix.

In the present invention, by processing and optimizing spectral data and RGB data in a parallel manner and then transferring in real time the preprocessed spectral data to a next step for hyperspectral video reconstruction, the efficiency of hyperspectral video reconstruction is improved. Meanwhile, the storage mode of the reconstruction spectral calibration data is reconstructed from a linear space to a two-dimensional space, so that the reconstruction related calibration points can be directly traversed and indexed, thereby decreasing the number of times of traversing the calibration matrix and reducing the computation amount of hyperspectral video reconstruction. Compared with the prior art, the method of the present invention can effectively acceleration of the hyperspectral video reconstruction without reducing the accuracy and spatial resolution of the hyperspectral video reconstruction.

BRIEF DESCRIPTION OF THE DRAWINGS

In order to describe the technical solutions in the embodiments of the present invention or in the prior art more clearly, the accompanying drawings to be used in the descriptions of the embodiments or the prior art will be briefly introduced below. Apparently, the accompanying drawings to be described hereinafter are some of the embodiments of the present invention, and a person of ordinary skill in the art can obtain other accompanying drawings according to these drawings without paying any creative effort.

FIG. 5 is an evaluation diagram of reconstruction results of the reconstruction method according to Embodiment 1 of the present invention.

DETAILED DESCRIPTION OF THE PRESENT INVENTION

In order to make the objectives, technical solutions and advantages of the present invention clearer, the implementations of the present invention will be further described below in detail with reference to the accompanying drawings.

Figure 1:
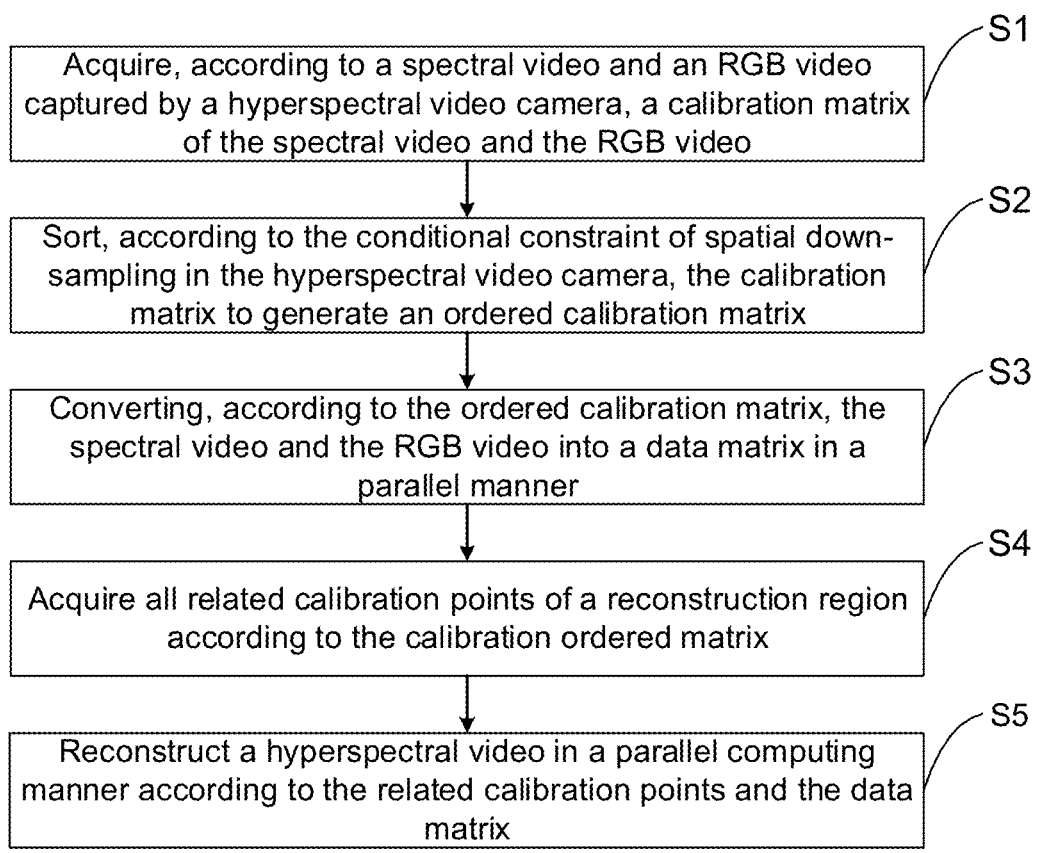
FIG. 1 is a flowchart of a method for accelerating hyperspectral video reconstruction according to the present invention.

With reference to FIG. 1, the present invention provides a method for accelerating hyperspectral video reconstruction, which is used to accelerate hyperspectral video reconstruction. The method includes the following specific steps.

S1: According to a spectral video and an RGB video captured by a hyperspectral video camera, a calibration matrix of the spectral video and the RGB video is acquired. Specifically:

The two-dimensional spatial coordinates of the first vertex (upper left) of each calibration rectangle of the spectral video are placed into a first-dimensional column vector, the two-dimensional spatial coordinates of the fourth vertex (lower right) of each calibration rectangle of the spectral video are placed into a second-dimensional column vector, and the two-dimensional spatial coordinates of each calibration point of the RGB video are placed into a third-dimensional column vector. The first-dimensional column vector, the second-dimensional column vector and the third-dimensional column vector are combined to form a three-dimensional column vector matrix after they are placed, and the three-dimensional column vector matrix is used as a calibration matrix.

S2: The calibration matrix is sorted according to the conditional constraint of spatial down-sampling in the hyperspectral video camera to generate an ordered calibration matrix.

Spatial down-sampling points of the hyperspectral video camera are distributed in the RGB video by using two-dimensional spatial coordinates (x, y), and the calibration matrix is sorted according to the distribution rule of the spatial down-sampling points.

The calibration matrix is vertically sorted by using a quick sorting algorithm (Quicksort) for two-dimensional space, that is, the whole calibration matrix is vertically sorted by using the quick sorting algorithm by comparing the size of the y-coordinate value of the third-dimensional column vector; and then, the calibration matrix is transversely sorted, that is, the whole calibration matrix is transversely sorted by the quick sorting algorithm by comparing the size of the x-coordinate value of the third-dimensional column vector. The specific quick sorting algorithm is as follows:

```
QUICKSORT(A, l, r, f)
if p < r
    then p ← PARTITION(A, l, r, f)
    QUICKSORT(A, l, p − 1, f)
    QUICKSORT(A, p + 1, r, f)
``` where A is the matrix to be sorted; p is the index of the fulcrum element of the matrix and divides the matrix into two parts; l is the index of the first element of the matrix; r is the index of the last element of the matrix; and, f is the flag bit for determining the sorting direction of the quick sorting algorithm for the two-dimensional matrix.

The PARTITION function is as follows:

```
PARTITION(A, l, r, f)
x ← A[r].x
y ← A[r].y
i ← p − 1
for j ← p to r − 1
    if f ≤ 0
        then do if A[j].x ≤ x
            then i ← i + 1
            exchange A[i].x ←→ A[j].x
            exchange A[i + 1].x ←→ A[r].x
            return i + 1
        if f > 0
            then do if A[j].y ≤ y
                then i ← i + 1
                exchange A[i].y ←→ A[j].y
                exchange A[i + 1].y ←→ A[r].y
                return i + 1
``` where x is the vertical coordinate of the element to be compared, y is the horizontal coordinate of the element to be compared, i is the position record index of the element smaller than x or j, and x is the matrix traversal index.

Two M ordered calibration matrices are generated according to the number of rows N and the number of columns M×N of the spatial down-sampling points of the hyperspectral video camera. The first ordered calibration matrix is placed in calibration data of the spectral video as a spectral ordered calibration matrix, the first-dimensional column vector and the second-dimensional column vector of the sorted calibration matrix are placed in the spectral ordered calibration matrix, a position where the spectral ordered calibration matrix does not contain the spatial down-sampling points of the hyperspectral video camera is set to be zero. The second ordered calibration matrix is placed in calibration data of the RGB video as an RGB ordered calibration matrix, the third-dimensional column vector of the sorted calibration matrix is placed in the RGB ordered calibration matrix, and a position where the RGB ordered calibration matrix does not contain the spatial down-sampling points of the hyperspectral video camera is set to be zero.

According to the RGB ordered calibration matrix, transverse distance values between non-zero data points among half of mark points are computed, and an average of the transverse distance values is recorded as a transverse distance between adjacent calibration points; and, according to the RGB ordered calibration matrix, vertical distance values between non-zero data points among half of mark points are computed, and an average of the vertical distance values is recorded as a vertical distance between adjacent calibration points.

S3: The spectral video and the RGB video are converted into a data matrix in a parallel computing manner according to the ordered calibration matrix. Specifically:

The midpoint of the transverse position of each calibration rectangle is acquired according to the spectral ordered calibration matrix, and the vertical length of each calibration rectangle is acquired according to the spectral ordered calibration matrix. The generation of the spectral data matrix is accelerated in a parallel computing manner in the spectral video according to the midpoint and the vertical length. The synthesis of the RGB data matrix is accelerated in a parallel computing manner according to the RGB video, and the spectral data matrix and the RGB data matrix are combined to form a data matrix.

S4: All related calibration points of a reconstruction region are acquired according to the ordered calibration matrix. Specifically:

A reconstruction range of each reconstruction point is computed according to the transverse distance between adjacent calibration points and the vertical distance between adjacent calibration points, and the RGB ordered calibration matrix can be directly indexed to obtain all related calibration points of each reconstruction point of the RGB data matrix.

S5: A hyperspectral video is reconstructed according to the related calibration points and the data matrix, so that acceleration is realized in a parallel computing manner.

Embodiment 1

The parameters of the devices for hyperspectral video reconstruction are as follows: processor: i7-4790K CPU@4 GHZ*8; memory: 32G; display card: GTX1080Ti; and, magnetic disc: 1T.

The parameters of the images for hyperspectral video reconstruction are as follows: wavelength range: 450 nm to 900 nm; spatial resolution: 1465×959; spectral resolution: 3 nm; and, the number of spectra bands: 143.

Figure 2:
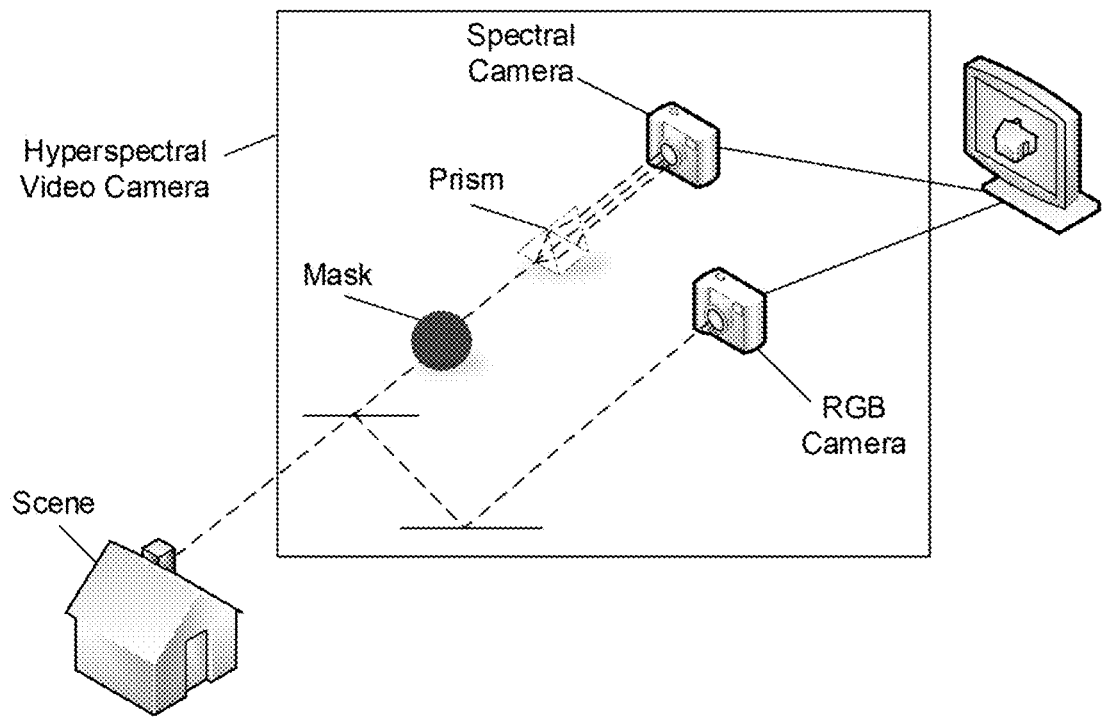
FIG. 2 is a schematic diagram of collecting spectral data and RGB data by a hyperspectral video camera.

As shown in FIG. 2, a dynamic scene is photographed by a hyperspectral video camera, and the dynamic scene is divided into two light paths by a spectroscope. The first light path is reflected to an RGB camera, and the second light path is transmitted to a mask for encoding, then directed to a prism for dispersion, and finally directed to a spectral camera. A spectral video and an RGB video are transmitted to a server through a data connection line and then computed by a hyperspectral video reconstruction algorithm, and a spectral image of a target band is displayed in real time.

Figure 3:
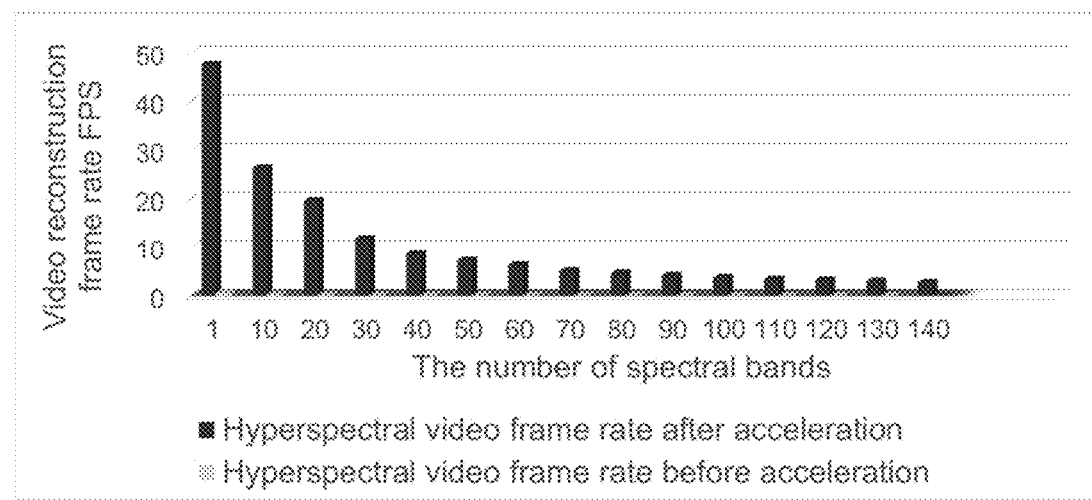
FIG. 3 is a comparison diagram of acceleration of hyperspectral video reconstruction according to Embodiment 1 of the present invention.

As shown in FIG. 3, after the acceleration by the method of the present invention, the maximum acceleration ratio of the reconstruction of the hyperspectral video (1465×959× 143) is about 75 times, and the frame rate of the reconstructed hyperspectral video is about 3 fps. With the increase of the number of spectral reconstruction channels, the reconstruction time will be increased. In the case of a single channel, before acceleration, the reconstruction time is 1562 ms, and the frame rate is about 0.6 frames; while after acceleration, the reconstruction time is 20 ms, and the frame rate is about 50 frames. If the number of spectral channels increases from a single channel to 143 channels, before acceleration, the reconstruction time is 20607 ms, and the frame rate is about 0.04 frames; while after acceleration, the reconstruction time is 336 ms, and the frame rate is about 3 frames.

Figure 4:
FIG. 4 is a single-band diagram of reconstructed (a) 500 nm, (b) 550 nm, (c) 600 nm, (d) 650 nm, (e) 700 nm and (f) 750 nm according to Embodiment 1 of the present invention.
Figure 4:
Figure 4:
Figure 4:
Figure 4:
Figure 4:

With reference to FIG. 4, in accordance with the method of the present invention, the image of each band of the hyperspectral video reconstruction is a high signal-to-noise ratio and clear texture, so that the spectral characteristics of the target scene are better restored. There is a smooth transition among the spectral images of the bands, and there are no over-dark or over-exposure points, so that the spectral light characteristics of the target scene are satisfied.

With reference to FIG. 5, the results of hyperspectral video reconstruction after acceleration in this embodiment are analyzed by using objective evaluation indexes of image quality:

Root mean square error:

$$RMSE = \sqrt{\frac{1}{W \times H} \sum_{k=1}^{W} \sum_{y=1}^{H} (g(x,y) - f(x,y))^2},$$

where g represents the image to be evaluated, f represents the reference image, and W and H represent the width and height of the image, respectively. The root mean square errors of corresponding points in two images are computed. If the value of RMSE is smaller, the difference between the image to be evaluated and the reference image is smaller, that is, the quality of the image to be evaluated is better.

Structural similarity:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)},$$

where x and y represent the image to be evaluated and the reference image, respectively; $\mu_x$ represents the mean in the direction of the image to be evaluated x; $\mu_y$ represents the mean in the direction of the reference image y; $\sigma_{xy}$ represents the covariance of x and y; $\sigma_x^2$ and $\sigma_y^2$ represents the variances of x and y, respectively; and, $c_1$ and $c_2$ are constants used to maintain stability. The SSIM ranges from 0 to 1. The larger the value of SSIM, the higher the similarity between images is, indicating that the quality of the image to be evaluated is better. The value of SSIM can better reflect the subjective perception of human eyes.

Peak signal-to-noise ratio: where $$MSE = \frac{1}{W \times H} \sum_{k=1}^{W} \sum_{y=1}^{H} (g(x,y) - f(x,y))^2.$$

The smaller the value of MSE is, the larger the value of PSNR is, and the better the quality of the image to be evaluated is. The PSNR is the most widely used method to evaluate the image quality, but the value of $$PSNR = 10 \times \log_{10}\left(\frac{(2^n-1)^2}{MSE}\right)$$

cannot better reflect the subjective perception of human eyes.

Embodiment 2

Figure 6:
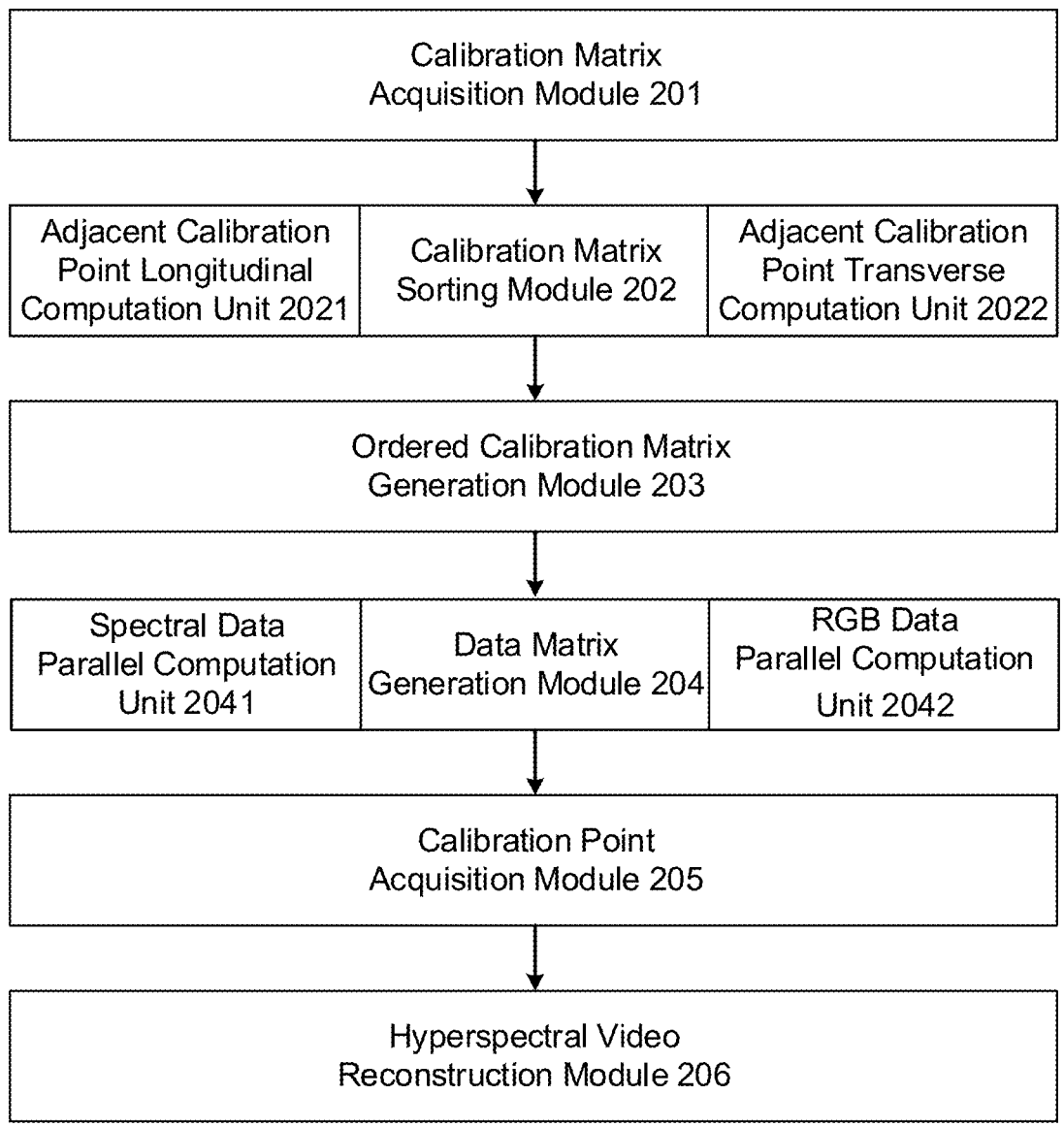
FIG. 6 is a schematic structure diagram of an apparatus for accelerating hyperspectral video reconstruction according to Embodiment 2 of the present invention.

With reference to FIG. 6, the present invention provides an apparatus for accelerating hyperspectral video reconstruction, which is used to accelerate hyperspectral video reconstruction.

The apparatus includes:
- a calibration matrix acquisition module 201 configured to acquire, according to a spectral video and an RGB video captured by a hyperspectral video camera, a calibration matrix of the spectral video and the RGB video;
- a calibration matrix sorting module 202 configured to sort the calibration matrix by a quick sorting algorithm according to the conditional constraint of spatial downsampling in the hyperspectral video camera;
- an adjacent calibration point vertical computation unit 2021 configured to compute an average transverse distance value between non-zero data points among half of mark points in an RGB ordered calibration matrix;
- an adjacent calibration point transverse computation unit 2022 configured to compute an average vertical distance value between non-zero data points among half of mark points in an RGB ordered calibration matrix;

an ordered calibration matrix generation module 203 configured to generate two M matrix spaces according to the number of rows N and the number of columns M×N of spatial down-sampling points of the hyperspectral video camera and place the sorted calibrated points into the matrix to generate an ordered calibration matrix;

a data matrix generation module 204 configured to convert the spectral video and the RGB video into a data matrix according to the ordered calibration matrix so as to realize acceleration in a parallel computing manner;

a spectral data parallel computation unit 2041 configured to copy a spectral ordered calibration matrix and the spectral video into a parallel computation memory, and perform thread indexing to control the computation of each spectral data point;

an RGB data parallel computation unit 2042 configured to copy the RGB video into the parallel computation memory and perform thread indexing to control the computation of each RGB data point;

a calibration point acquisition module 205 configured to acquire all related calibration points of a reconstruction region according to the ordered calibration matrix; and a hyperspectral video reconstruction module 206 configured to reconstruct a hyperspectral video according to the related calibration points and the data matrix so as to realize acceleration in a parallel computing manner.

All or some of the above technical solutions in the embodiments of the present invention can be completed by instructing the related hardware through programs, and the programs can be stored in a readable storage medium. This storage medium includes: ROMs, RAMs, magnetic discs, optical discs or various mediums capable of storing program codes.

The forgoing description merely shows preferred embodiments of the present invention and is not intended to limit the present invention. Any modification, equivalent replacement and improvement made without departing from the spirit and principle of the present invention shall fall into the protection scope of the present invention.

The invention claimed is:

1. A method for accelerating hyperspectral video reconstruction, comprising steps of:
    S1: acquiring, according to a spectral video and an RGB video captured by a hyperspectral video camera, a calibration matrix of the spectral video and the RGB video;
    S2: sorting, according to a conditional constraint of spatial down-sampling in the hyperspectral video camera, the calibration matrix to generate an ordered calibration matrix;
    S3: converting, according to the ordered calibration matrix, the spectral video and the RGB video into a data matrix in a parallel computing manner;
    S4: acquiring all related calibration points of a reconstruction region according to the ordered calibration matrix; and
    S5: reconstructing a hyperspectral video in a parallel computing manner according to the related calibration points and the data matrix.

2. The method for accelerating hyperspectral video reconstruction according to claim 1, wherein step S1 further comprises:
    placing two-dimensional spatial coordinates of a first vertex of each calibration rectangle of the spectral video into a first-dimensional column vector, placing two-dimensional spatial coordinates of lithe a fourth vertex of each calibration rectangle of the spectral video into a second-dimensional column vector, and placing two-dimensional spatial coordinates of each calibration point of the RGB video into a third-dimensional column vector; and, combining the first-dimensional column vector, the second-dimensional column vector and the third-dimensional column vector to form a three-dimensional column vector matrix, and using the three-dimensional column vector matrix as a calibration matrix.

3. The method for accelerating hyperspectral video reconstruction according to claim 2, wherein step S2 further comprises:
    distributing spatial down-sampling points of the hyperspectral video camera in the RGB video by using two-dimensional spatial coordinates (x,y), and sorting the calibration matrix according to a distribution rule of the spatial down-sampling points;
    vertically sorting the entire calibration matrix by using a quick sorting algorithm by comparing a size of the y-coordinate value of the third-dimensional column vector;
    transversely sorting the whole calibration matrix by the quick sorting algorithm by comparing a size of the x-coordinate value of the third-dimensional column vector;
    generating two M×N ordered calibration matrices according to the number of rows M and the number of columns N of the spatial down-sampling points of the hyperspectral video camera;
    placing a first ordered calibration matrix in calibration data of the spectral video as a spectral ordered calibration matrix;
    putting the first-dimensional column vector and the second-dimensional column vector of the sorted calibration matrix in the spectral ordered calibration matrix;
    setting a position where the spectral ordered calibration matrix does not contain the spatial down-sampling points of the hyperspectral video camera to be zero;
    placing a second ordered calibration matrix in calibration data of the RGB video as an RGB ordered calibration matrix;
    placing the third-dimensional column vector of the sorted calibration matrix in an RGB ordered calibration matrix; and
    setting a position where the RGB ordered calibration matrix does not contain the spatial down-sampling points of the hyperspectral video camera to be zero;
    according to the RGB ordered calibration matrix, computing transverse distance values between non-zero data points among half of mark points, and recording an average of the transverse distance values as a transverse distance between adjacent calibration points; and,
    computing vertical distance values between non-zero data points among half of mark points, and recording an average of the vertical distance values as a vertical distance between adjacent calibration points.

4. The method for accelerating hyperspectral video reconstruction according to claim 3, wherein step S3 further comprises:
    Acquiring a midpoint of a transverse point of each calibration rectangle according to the spectral ordered calibration matrix;
    acquiring a vertical length of each calibration rectangle according to the spectral ordered calibration matrix;

accelerating the generation of a spectral data matrix in a parallel computing manner in the spectral video; accelerating a synthesis of an RGB data matrix in a parallel computing manner according to the RGB video; and, combining the spectral data matrix and the RGB data matrix to form a data matrix.

5. The method for accelerating hyperspectral video reconstruction according to claim 4, wherein step S4 further comprises:

computing a reconstruction range of each reconstruction point according to the transverse distance between adjacent calibration points and the vertical distance between adjacent calibration points, and directly indexing the RGB ordered calibration matrix to obtain all related calibration points of each reconstruction point of the RGB data matrix.

6. An apparatus for accelerating hyperspectral video reconstruction, comprising:

A calibration matrix acquisition module configured to acquire a calibration matrix of a captured spectral video and RGB video;

a calibration matrix sorting module configured to sort the calibration matrix;

an adjacent calibration point vertical computation unit configured to compute an average transverse distance value between non-zero data points among half of mark points in an RGB ordered calibration matrix;

an adjacent calibration point transverse computation unit configured to compute an average vertical distance value between non-zero data points among half of mark points in the RGB ordered calibration matrix;

an ordered calibration matrix generation module configured to generate an ordered calibration matrix according to spatial down-sampling points of a hyperspectral video camera;

a data matrix generation module configured to convert the spectral video and the RGB video into a data matrix in a parallel manner according to the ordered calibration matrix;

a spectral data parallel computation unit configured to copy a spectral ordered calibration matrix and the spectral video into a parallel computation memory, and perform thread indexing to control the computation of each spectral data point;

an RGB data parallel computation unit configured to copy the RGB video into the parallel computation memory and perform thread indexing to control the computation of each RGB data point;

a calibration point acquisition module configured to acquire all related calibration points of a reconstruction region according to the ordered calibration matrix; and a hyperspectral video reconstruction module configured to reconstruct a hyperspectral video in a parallel manner according to the related calibration points and the data matrix.

* * * * *